(12) United States Patent
Wood et al.

(10) Patent No.: US 6,360,053 B1
(45) Date of Patent: Mar. 19, 2002

(54) METHOD AND APPARATUS FOR FAST FORWARDING AND REWINDING IN A VIDEO RECORDING DEVICE

(75) Inventors: Anthony Wood, Palo Alto; Donald Woodward, Jr., Los Altos; Doug Shannon, Sunnyvale, all of CA (US)

(73) Assignee: ReplayTV, Inc., Mountain View, CA (US)

(*) Notice: Subject to any disclaimer, the term of this patent is extended or adjusted under 35 U.S.C. 154(b) by 0 days.

(21) Appl. No.: 09/541,993

(22) Filed: Apr. 3, 2000

Related U.S. Application Data

(63) Continuation of application No. 09/415,777, filed on Oct. 8, 1999, now abandoned, which is a continuation of application No. 09/290,374, filed on Apr. 12, 1999, now abandoned, which is a continuation-in-part of application No. 09/130,994, filed on Aug. 7, 1998.

(51) Int. Cl.$^7$ .................................................. H04N 5/91
(52) U.S. Cl. ............................ 386/67; 386/68; 386/125
(58) Field of Search .............................. 386/67, 68, 69, 386/83, 104, 105, 106, 109, 111, 112, 124, 125, 126, 45, 27, 33, 6, 39, 40; H04N 5/783, 5/921, 5/781

(56) References Cited

U.S. PATENT DOCUMENTS 5,377,051 A * 12/1994 Lane et al. ................. 360/33.1

* cited by examiner

Primary Examiner—Robert Chevalier
(74) Attorney, Agent, or Firm—Blakely Sokoloff Taylor & Zafman, LLP

(57) ABSTRACT

A method and apparatus providing for "instant replays" and "quick skip" functionality in a media playback device. In the case of an instant replay, under user control, the media playback moves temporally backwards. In the case of quick skip, under user control, the media playback moves temporally forward. In one embodiment, the temporal movement is based on a predetermined time (e.g., move back 5 seconds, move forward 30 seconds). In another embodiment, the temporal movement is based on scene change analysis:

10 Claims, 3 Drawing Sheets

METHOD AND APPARATUS FOR FAST FORWARDING AND REWINDING IN A VIDEO RECORDING DEVICE

RELATED APPLICATIONS

This is a continuation of co-pending U.S. patent application Ser. No. filed Oct. 8, 1999 09/415,777 ABN which is a continuation of U.S. patent application Ser. No.: 09/290,374, filed Apr. 12, 1999, which is a continuation-in-part of 09/130,994, filed Aug. 7,1998.

BACKGROUND OF THE INVENTION

1. Field of the Invention

The present invention relates to media viewing devices and, more specifically, to video viewing devices. In certain embodiments, the present invention may also have application to audio recording devices.

2. Description of the Related Art

Video data recorders are well-known in the art. Initially, video data recorders were designed to record video signals on video tape and to allow play back of recorded video signals from the tape. Of course, video tapes require sequential recording and playback limiting the functionality of such machines.

Disk-based video playback machines have been introduced such as video disks and more recently digital video disk machines. These machines may be generally characterized as providing a removable randomly accessed disk allowing for the storage and playback of video signals.

U.S. Pat. No. 5,241,428 (the '428 patent) describes a video recording and playback device. The described system provides for simultaneous playback and recording of video signals on a randomly accessed recording medium. By allowing simultaneous recording and playback of video signals and by allowing for random access of the recording medium, additional functionality may be provided beyond that realized by a video tape recording machine.

While the '428 patent describes a randomly accessed video recording and playback device, it fails to describe or suggest significant functionality which may be implemented in such a device.

Thus, what is needed is an improved video data recorder having increased functionality.

SUMMARY OF THE INVENTION

A method and apparatus providing for "instant replays" and "quick skip" functionality in a media playback device is described. In the case of an instant replay, under user control, the media playback moves temporally backwards. In the case of quick skip, under user control, the media playback moves temporally forward.

In one embodiment, the temporal movement is based on a predetermined time (e.g., move back 5 seconds, move forward 30 seconds). In another embodiment, the temporal movement is based on scene change analysis.

Figure 1:
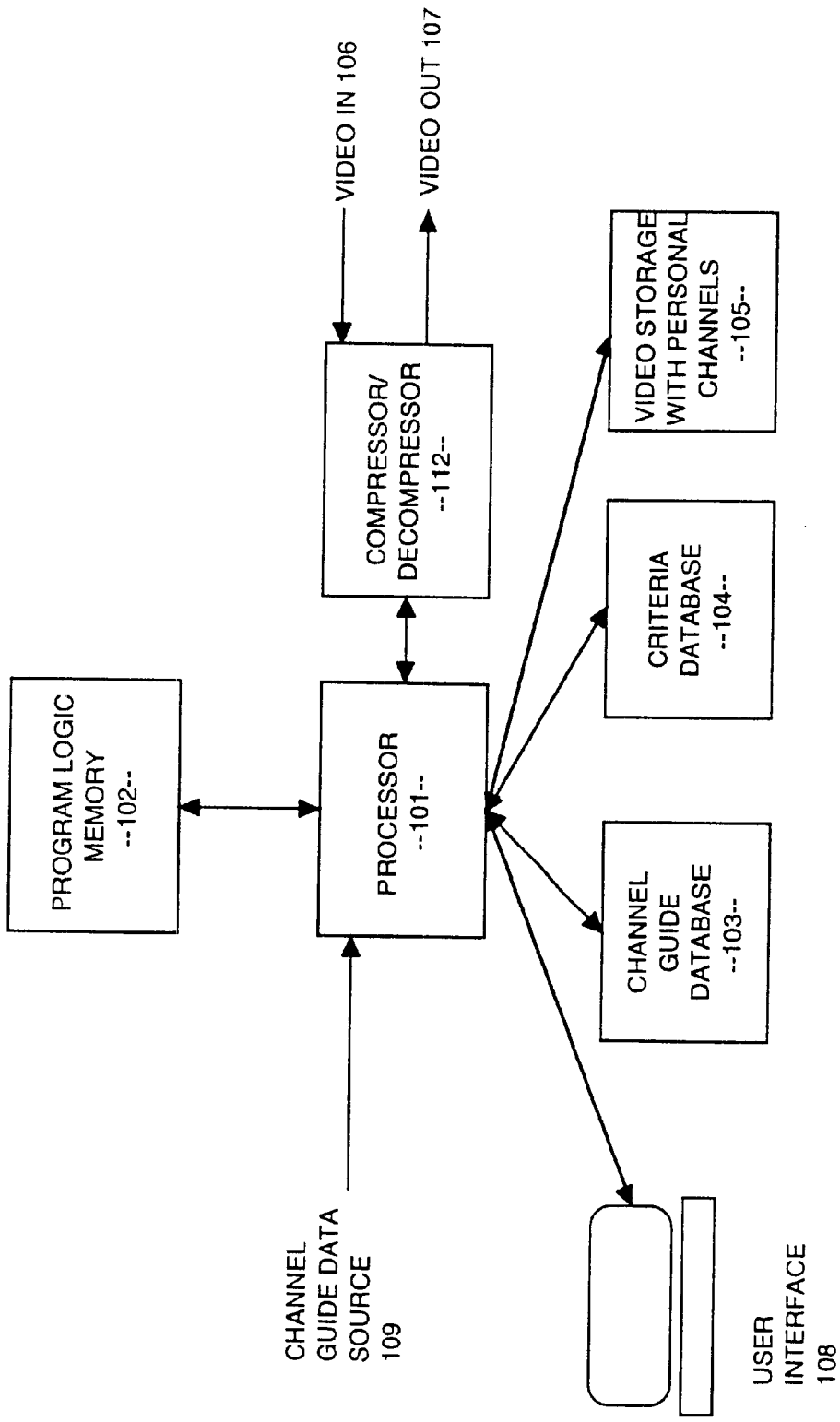
FIG. 1 is a high level block diagram illustrating a video data recorder of an embodiment of the present invention.
Figure 3:
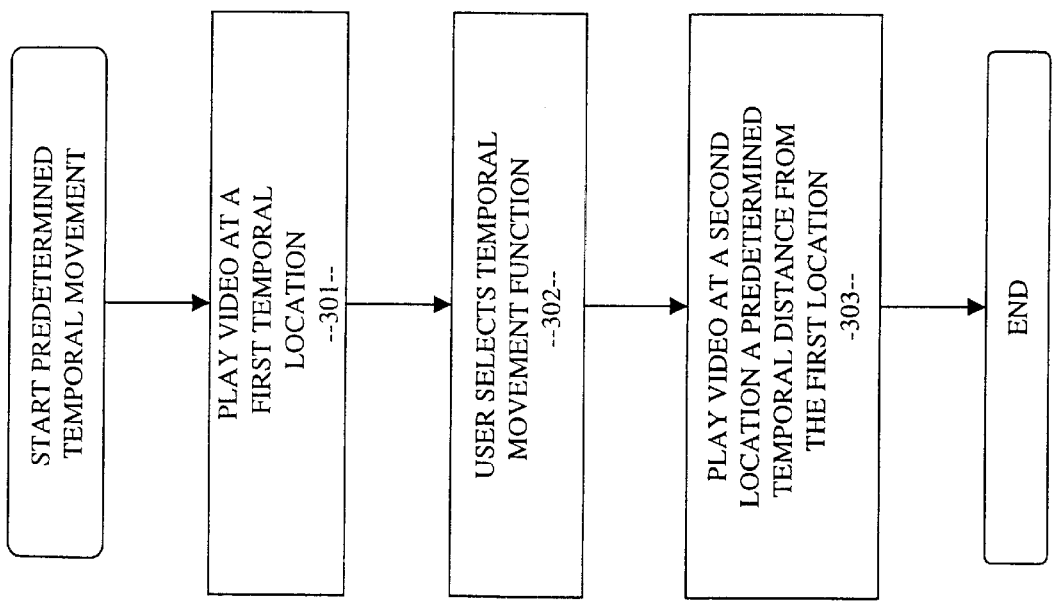
FIG. 3 is a flow diagram of a second method of user controlled temporal movement through media.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS THE PRESENT INVENTION

Block Diagram Architecture of the VDR

FIG. 1 provides a high-level block diagram view of a video data recorder (VDR) as may utilize the present invention.

A processor 101 is coupled in communication with a channel guide database 103, a criteria database 104, video storage 105 (also referred to as the recording medium), program logic memory 102, a video compressor/decompressor 112, a video input source 106, a video output 107, a channel guide data source 109 and a user interface 108.

The processor 101 may be any of a plurality of commercially available processors such as a processor from the Motorola 68000 series of processors, a processor from the Intel 8086 family of processors or a higher level processor such as a processor from the Intel Pentium™ family of processors or from the Motorola PowerPC™ family of processors. The processor in the described embodiment acts under program control by a program stored in program logic memory 102 to perform functions, such as "fast forwarding" and "rewinding", which will be described in greater detail below.

The channel guide data source 109 provides periodic updates to the local channel guide database 103. The channel guide data source 109 provides program titles, start times, end times, channel information and other criteria (such as ratings, descriptions of shows, names of actors, producers, directors, awards and rating information) regarding channel programming. Channel guide data sources are available commercially from TVGuide™, TV Data, and Tribune media. The channel guide source may be accessed periodically to obtain changes and additions over any of a number of communication mediums. For example, the channel guide source may be accessed telephonically by a modem connection to a server or by receiving broadcasted updates and changes from a source such as satellite or terrestial VBI, national pager network or the internet. In other embodiments, the channel guide source may be obtained periodically such as by subscription and received on a recording media such as a disk through the mail or other source.

The channel guide database 103 is illustrated in the described embodiment as being stored on a locally attached disk. In alternative embodiment, the channel guide database may be stored locally in alternative storage media such as RAM. In other embodiments, a channel guide database 103 may be stored on a remote server and queried for matches with the criteria database 104 periodically. The locally stored channel guide database 103 would be replaced with a "match" database in such an embodiment. Such an embodiment reduces the need for local storage and reduces the required bandwidth and processing power to periodically obtain and store a complete local channel guide database. However, this embodiment does depend on a relatively reliable connection to the server storing the channel database.

The criteria database 104 provides criteria for selection of programming from the channel guide database. The criteria are user defined and input through user interface 108. Based on matches between the criteria database 104 and the channel guide database 103, the processor causes video input signals to be recorded on video storage 105.

In the described embodiment, video storage 105 is a high capacity, recordable, randomly accessible recording medium such as a hard disk. Use of a randomly accessible recording medium provides certain advantages such as allowing a user to simultaneously record and playback video signals. Thus, a user may view a program as it is being recorded and take advantage of the rewind, pause and fast forward capabilities of the VDR. However, in certain embodiments a sequential recording medium may be utilized without departure from certain aspects of the present invention.

The video input source 106 may be any of a number of sources including cable, over-the-air broadcast and satellite. In certain embodiments, multiple video input sources may be utilized. The video output source 107 is typically coupled with a display device such as a television but may also be coupled with another video data recorder.

The video compressor/decompressor 112 provides for compressing and decompressing the video signal. Any commercially available compression technology may be utilized including by way of example MPEG and MPEG II.

In alternative embodiments, the data may be received in a compressed format. In such an embodiment, the compressor may not be utilized or even required and the decompressor may only be utilized to decompress the compressed signals.

Temporal Movement Through the Media

Importantly, the disclosed embodiment provides certain user interface features. For example, in the disclosed embodiment it is possible to fast forward and rewind through recorded programming.

Figure 2:
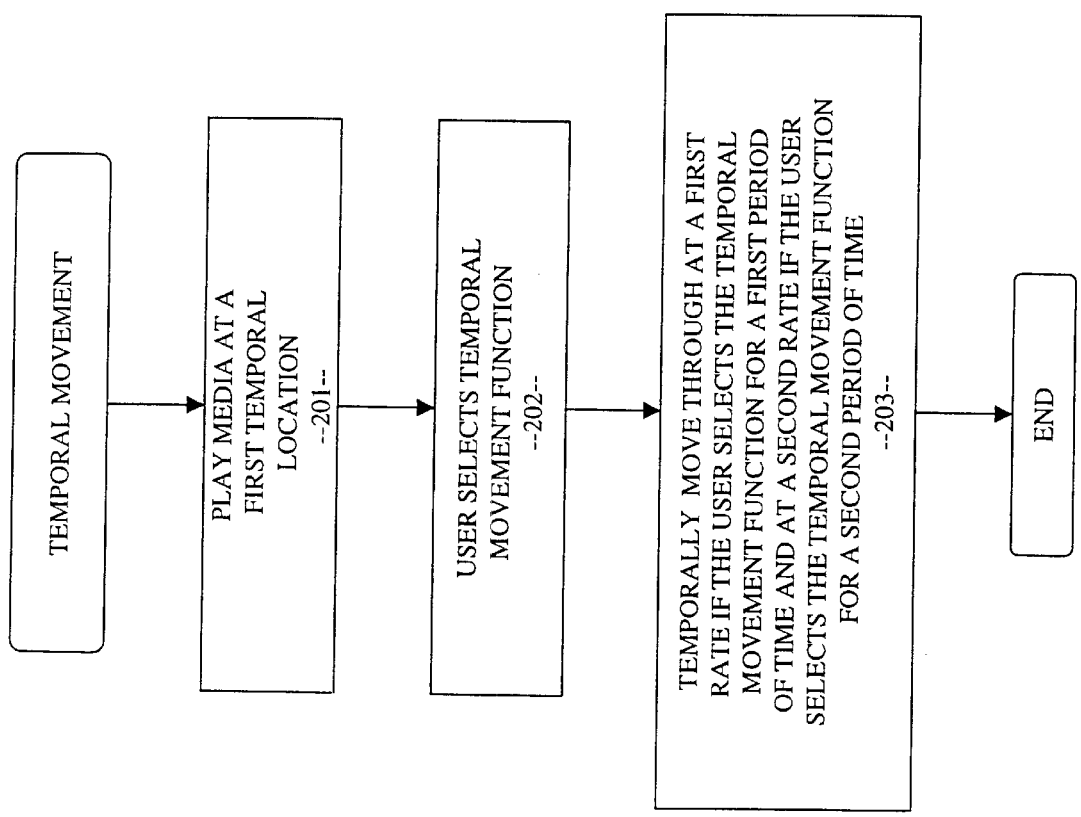
FIG. 2 is a flow diagram a method of user controlled temporal movement through media.

In one embodiment, the user may increase the rate of fast forwarding and/or rewinding by continuing to depress the fast forward and/or rewind button for a period of time. For example, if the button is pressed instantaneously, the system may fast forward or rewind at one speed and the speed may continuously increase the longer the button is depressed. This feature is described in connection with FIG. 2 which illustrates initially that the media is playing at a first temporal location, block 201. The user selects a temporal movement function (e.g., the fast forward or rewind button on the remote control), block 202. Responsive to selection of the temporal movement function, rate of playback of the media is increased to a first rate if the temporal movement function is selected for a first period of time and at a second rate if the temporal movement function is selected for a second period of time, block 203.

In addition, the described embodiment provides an instant replay function. The user may depress the instant replay button and the system will automatically "rewind" (move the point of viewing of the programming back in time, e.g., back temporally) a predetermined amount (e.g., 5 seconds) in the programming.

The described embodiment also provides a function for quickly advancing a predetermined temporal amount forward (e.g., 30 seconds). In certain embodiments, the predetermined temporal amount to move forward is chosen based on the length of a typical commercial allowing the user to quickly skip through commercials.

FIG. 3 illustrates an overall flow diagram of a method of moving a predetermined temporal distance, based on user activation of function. The user function may be activated, for example, by the user depressing a button on a remote control device. As is illustrated by FIG. 3, initially, the media (which is illustrated in the figure as being video but in alternative embodiments may be audio) is playing a first temporal location, block 301. The user selects a temporal movement function, block 302. As was just discussed, the temporal movement may be either a predetermined distance forward or a predetermined distance backward. Responsive to the user selecting the temporal movement function, the play resumes at a second position temporally forward from or temporally backward from the first position.

In both the case of moving temporally forward and temporally backward, the predetermined period of time may be set by the manufacturer of the device or may be user settable.

In an alternative embodiment, the movement backward or forward may be based on scene change analysis. For example, the "instant replay" function may skip back to the immediately preceding scene based on analysis of video frames and attempting to look for a scene change.

Thus, what has been disclosed is an improved video data recorder.

What is claimed is:

1. A method of playback of media comprising:

playing the media;

a user activating a temporal movement function;

responsive to the user activating the temporal movement function, temporally moving through the media at a first speed if the user activates the temporal movement function for a first period of time and at a second speed if the user activates the temporal movement function for a second period of time.

2. The method as recited by claim 1 wherein the media is video media.

3. The method as recited by claim 1 wherein the media is audio media.

4. The method as recited by claim 1 wherein the temporal movement is forward.

5. The method as recited by claim 1 wherein the temporal movement is backward.

6. A method for playback of media comprising:

playing the media;

a user activating a temporal movement function;

responsive to the user activating the temporal movement function, temporally moving through the media at a first speed if the user activates the temporal movement function for a first period of time and increasing the speed of temporal movement if the user continues to activate the temporal movement function for longer than the first period of time.

7. The method as recited by claim 6 wherein the media is video media.

8. The method as recited by claim 6 wherein the media is audio media.

9. The method as recited by claim 6 wherein the temporal movement is forward.

10. The method as recited by claim 6 wherein the temporal movement is backward.

\* \* \* \* \*